Patented Nov. 26, 1940

2,222,649

UNITED STATES PATENT OFFICE 2,222,649

MOTOR FUEL

James H. Boyd, Jr., Philadelphia, Pa., assignor to The Atlantic Refining Company, Philadelphia, Pa., a corporation of Pennsylvania No Drawing. Application April 3, 1937,
Serial No. 134,842

4 Claims. (Cl. 44—9)

The present invention relates to the production of motor fuel of improved anti-detonation characteristics, and relates more particularly to the production of anti-detonation agents, which, in themselves, may be employed as motor fuel or as addition agents for hydrocarbon motor fuels.

A principal object of this invention is the conversion of hydrocarbon sulfonic compounds, and particularly petroleum sulfonic acids and/or sulfonates resulting from the sulfuric acid treatment of light petroleum oils into compounds suitable for use as motor fuels, motor fuel addition agents or solvents for gums, resins, lacquers and the like.

A further object of this invention is the conversion of preferably water-soluble sulfonic acids or sulfonates derived from the sulfonation of petroleum naphtha, gasoline, kerosene or gas oil into improved motor fuels or solvents by the thermal treatment of the alkali metal sulfonates in the presence of alkali metal cyanides.

Briefly, my invention comprises the thermal treatment or fusion of a petroleum sulfonic compound with an alkali metal cyanide such as sodium or potassium cyanide at temperatures sufficient to effect reaction and/or decomposition of the sulfonic compound in the presence of an alkali metal cyanide. Such thermal treatment or fusion is preferably carried on at temperatures between about 400° F. and 900° F., and at pressures which may be sub-atmospheric, atmospheric or super-atmospheric. The products, usually oily liquids, may be separated from the reaction mixture either during the fusion, or after fusion has been completed. The separation may be accomplished simply by vaporization or distillation of the oily products directly from the reaction mixture, and the oily products may be separated into fractions by fractional condensation. Or, the oily products from the fusion treatment may be condensed and the resulting liquid washed with water and/or dilute mineral acids and subjected to fractional distillation for the separation of fractions of varying boiling range.

My invention may be further illustrated by the following example:

Petroleum sulfonic acids resulting from the sulfuric acid treatment of a recycle gas oil from a high temperature cracking process were recovered from the acid sludge produced by such treatment and were neutralized with sodium hydroxide to yield the corresponding alkali metal sulfonates. Approximately 200 parts by weight of the recovered sulfonates were admixed with about 107 parts by weight of sodium cyanide and the mixture was subjected to gradual heating. At a temperature of about 575° F. water was given off, and at about 600° F. oily liquids and ammonia resulting from the reaction commenced to distill from the mixture, together with water. The temperature was gradually raised to about 855° F. and maintained until the reaction appeared to have been completed and no further distillate of the oily liquid was obtained. The crude oily product, amounting to about 71 parts by weight was washed successively with water and dilute mineral acid to remove ammonia, and then with water to remove traces of mineral acid. The oily product was thereafter dried and subjected to distillation at reduced pressure (about 1 m/m. absolute), a total distillate of 91% being recovered, based upon the crude oily product charged. The distillation was carried on in such a manner as to produce three distillate fractions, having boiling ranges as follows:

| Distillate | Boiling range (1 m/m. absolute) | Yield |
|---|---|---|
| | °F. | Percent |
| Cut #1 | 92 to 194 | 32.8 |
| Cut #2 | 195 to 315 | 48.7 |
| Cut #3 | 316 to 383 | 9.5 |
| Bottoms | >384 | 9.0 |

In order to ascertain the value of the oily product as an anti-detonation agent, about 10% by volume of the most volatile fraction, i. e., Cut #1, was blended with a straight-run gasoline having an octane number of 41 (A. S. T. M.—C. F. R. Method D 357-34 T). The resulting blended fuel had an octane number of 50. By employing sulfonic compounds produced by the sulfonation of petroleum distillates lighter than gas oil, for example, gasoline or kerosene sulfonates, there may be obtained by the fusion treatment a greater yield of lower boiling oily products, particularly oily materials boiling within the gasoline or motor fuel distillation range, i. e., from about 100° F. to about 400° F. at atmospheric pressure. In general I prefer to employ as a source of sulfonic compounds, petroleum hydrocarbons boiling within the gasoline-gas oil boiling range, i. e., from about 100° F. to about 700° F.

The oily product produced by the above described method may likewise be employed as a solvent or thinner for paints, varnishes, lacquers, gums, or resins and the like. The addition of about 33% by volume of Cut #1 to a petroleum solvent naphtha having a kauri-butanol number of 41 (Circular #378, Amer. Paint & Varnish Mfgrs. Assn., Feb. 1931), raised such number to 58, thus indicating the marked increase in solvent power of the blended material.

While, in the above examples, I have shown the use of the oily products obtained by the thermal treatment of alkali metal sulfonates in the presence of an alkali metal cyanide as addition agents for motor fuels and solvents, I may also employ such oily products, per se, as fuels or solvents.

In the production of blended motor fuels containing the oily products of this invention, there may be employed in lieu of or in addition to petroleum distillate or gasoline, other materials such alcohol, benzol, esters, ethers and ketones or mixtures thereof. Likewise, in the production of solvents or thinners containing the described oily products, there may be employed in addition to or in lieu of a petroleum solvent naphtha, other agents such as alcohols, esters, ethers or ketones and the like.

What I claim is:

1. The method of increasing the anti-detonation characteristics of gasoline, which comprises adding to the gasoline, in an amount sufficient to substantially increase the anti-detonation characteristics thereof, a liquid oily material boiling over a substantial range within the temperatures of from about 100° F. to about 400° F., and produced by the fusion of an alkali metal cyanide with an alkali metal salt of a petroleum sulfonic acid derived from petroleum hydrocarbons boiling within the range of from about 100° F. to about 700° F.

2. The method of increasing the anti-detonation characteristics of gasoline, which comprises adding to the gasoline, in an amount sufficient to substantially increase the anti-detonation characteristics thereof, a liquid oily material boiling over a substantial range within the temperatures of from about 100° F. to about 400° F., and produced by the fusion, at a temperature within the range of from about 400° F. to about 900° F., of an alkali metal cyanide with an alkali metal salt of a petroleum sulfonic acid derived from petroleum hydrocarbons boiling within the range of from about 100° F. to about 700° F.

3. A motor fuel of improved anti-detonation characteristics, comprising gasoline to which has been added a liquid oily material boiling over a substantial range within the temperatures of from about 100° F. to about 400° F., and resulting from the fusion of an alkali metal cyanide with an alkali metal salt of a petroleum sulfonic acid derived from petroleum hydrocarbons boiling within the range of from about 100° F. to about 700° F.

4. A motor fuel of improved anti-detonation characteristics, comprising gasoline to which has been added a liquid oily material boiling over a substantial range within the temperatures of from about 100° F. to about 400° F., and resulting from the fusion, at a temperature within the range of from about 400° F. to about 900° F., of an alkali metal cyanide with an alkali metal salt of a petroleum sulfonic acid derived from petroleum hydrocarbons boiling within the range of from about 100° F. to about 700° F.

JAMES H. BOYD, Jr.